(12) United States Patent
Zupnick (10) Patent No.: US 9,803,314 B1
(45) Date of Patent: Oct. 31, 2017

(54) PORTABLE CLOTHES DRYING APPARATUS HAVING HOT AIR TO COLD AIR SWITHCING CAPABILITY

(71) Applicant: Chesky Zupnick, New York, NY (US)

(72) Inventor: Chesky Zupnick, New York, NY (US)

( * ) Notice: Subject to any disclaimer, the term of this patent is extended or adjusted under 35 U.S.C. 154(b) by 0 days.

(21) Appl. No.: 15/600,855

(22) Filed: May 22, 2017

Related U.S. Application Data (60) Provisional application No. 62/483,395, filed on Apr. 9, 2017.

(51) Int. Cl.
  *D06F 59/02* (2006.01)
  *F24F 13/32* (2006.01)
  *F26B 9/00* (2006.01)
  *F26B 21/06* (2006.01)

(52) U.S. Cl.
  CPC ............ *D06F 59/02* (2013.01); *F24F 13/32* (2013.01); *F26B 9/00* (2013.01); *F26B 9/003* (2013.01); *F26B 21/06* (2013.01)

(58) Field of Classification Search
  CPC ......... D06F 59/02; A47G 25/00; A47G 25/70; A47G 2025/1485; F24F 13/32; F26B 9/00; F26B 9/003; F26B 21/06; A41D 27/22; A41H 5/00
  See application file for complete search history.

(56) References Cited

U.S. PATENT DOCUMENTS

| | | | |
|---|---|---|---|
| 8,667,707 B2 * | 3/2014 | Date | D06F 58/203 211/195 |
| 8,789,729 B2 * | 7/2014 | Beckett | D06F 59/02 223/120 |
| 2006/0226177 A1 | 10/2006 | Mc Junkin | |
| 2009/0129972 A1 * | 5/2009 | Di Bono | A47G 25/60 422/5 |
| 2011/0072682 A1 * | 3/2011 | Beckett | D06F 59/02 34/621 |
| 2016/0108576 A1 | 4/2016 | Levy | |

FOREIGN PATENT DOCUMENTS

| | | | |
|---|---|---|---|
| JP | 2003230476 A | * | 8/2003 |
| KR | 2016129452 A | * | 11/2016 |
| WO | WO2008111982 A1 | * | 9/2008 |
| WO | WO2017045170 A1 | * | 3/2017 |

* cited by examiner

Primary Examiner — Ismael Izaguirre
(74) Attorney, Agent, or Firm — Robert DeWitty (57) ABSTRACT

The present invention comprises an apparatus having a base that has the ability to inlet air, a heater contained within the core of the base whereby the heater can be turned on or turned off either manually, or an auto-fashion, circuitry that allows control of the clothes drying process, outlets that deliver hot air, cool air, or alternating hot air, cool air be passed to attached clothes and a hanging mechanism that allows various clothes to be hung on the apparatus.

17 Claims, 6 Drawing Sheets

PORTABLE CLOTHES DRYING APPARATUS HAVING HOT AIR TO COLD AIR SWITHCING CAPABILITY

This application claims priority to provisional application 62/483,395, filed Apr. 9, 2017.

BACKGROUND

The air drying of clothes, whether the clothes be directly from a washing machine or from circumstances such as being caught in a rainstorm, has been a regular practice throughout the history of textiles. It is believed the air drying of the textiles such as clothes, is beneficial to the wear and tear of the textile. However, air drying, usually at room temperature, is generally a long process. When in particular environments the air is humid, air drying is almost impossible. Therefore, different methods of speeding the drying of clothes have been developed. In an everyday example, the use of a clothes dryer, such as a floor standing machine that disperses heat within its inner vacuum, has been deemed to be suitable for drying of clothes. Additionally, clothes drying disperses both hot air and cool air, as hot air and cool air have different benefits to textiles. However, because of the physical size of clothes dryers, it is not possible for a person to always have a clothes dryer handy. This occurs when the person travels to a different location from their home. Therefore, a new solution is necessary to allow the clothes drying at any time in any environment.

The present invention proposes a means for drying clothes in accordance with the floor standing clothes dryers method, which includes delivering hot air, cool air, or an alteration of hot air and cool air to a textile, for example, pants, shirt, jacket, etc. to allow the speedy drying of clothes at any time in any environment.

The present invention comprises an apparatus having a base that has the ability to inlet air, a heater contained within the core of the base whereby the heater can be turned on or turned off either manually, or an auto-fashion, circuitry that allows control of the clothes drying process, outlets that deliver hot air, cool air, or alternating hot air, cool air be passed to attached clothes and a hanging mechanism that allows various clothes to be hung on the apparatus.

Through the present invention, various textile items, such as clothes, shoes, gloves, etc. can be dried within a significantly shorter period of time in comparison to air drying, anywhere a user travels to. Further, through the instant invention the drying of the clothes adheres to the known principles of using cool air, and hot air in alternating combination. This contrasts with other portable clothes dryers whereby only hot air is passed through, or cool air is passed through.

In comparison to the prior art, the present invention, through the circuitry that includes a PCB Board upon which can be installed a processor, a timer, the apparatus has an auto-heat/auto-cool function, which can be based on either the timing, i.e. the apparatus dries clothes under heat for a period of time, then the apparatus cools the clothes for a period of time, or based on the condition of the clothes, the apparatus can detect the moisture of the clothes and thus apply either heat or cool air depending on the need of the clothes. Further, the apparatus can include a data entry interface, whereby the type of clothes hung on the apparatus, such as 100% cotton, 100% polyester, a cotton/polyester blend, etc. the apparatus can then apply either appropriate hot, or appropriate cool air, as needed. The apparatus has an indicator/controller on its external that allows the user to determine whether the apparatus is providing heat air or cool air, at any point in time during the operation of the apparatus. A user can manually change the hot air and cool air being applied to the attached clothes, in other words, by pressing the indicator/controller. The indicator/controller acts as a switching mechanism of the controller.

DETAILED DESCRIPTION

It will be readily understood that the components of the embodiments as generally described and illustrated in the figures herein may be arranged and designed in a wide variety of different configurations in addition to described example embodiments. Thus, the following more detailed description of the example embodiments, as represented in the figures, is not intended to limit the scope of the embodiments, as claimed, but is merely representative of example embodiments.

Furthermore, the described features, structures, or characteristics may be combined in any suitable manner in one or more embodiments. In the following description, numerous specific details are provided to give a thorough understanding of embodiments. One skilled in the relevant art, however, that the various embodiments can be practiced without one or more of the specific details, or with other methods. In other instances, well-known structures, materials, or operations are not shown or described in detail to avoid obfuscation. The following description is intended only by way of example and simply illustrates certain example embodiments.

It should be expressly understood that the drawings are included for illustrative purposes and do not represent the scope of the present system. In the accompanying drawings, like reference numbers and different drawings may designate similar elements.

Now, referring to FIGS. 1 through 6.

Figure 1:
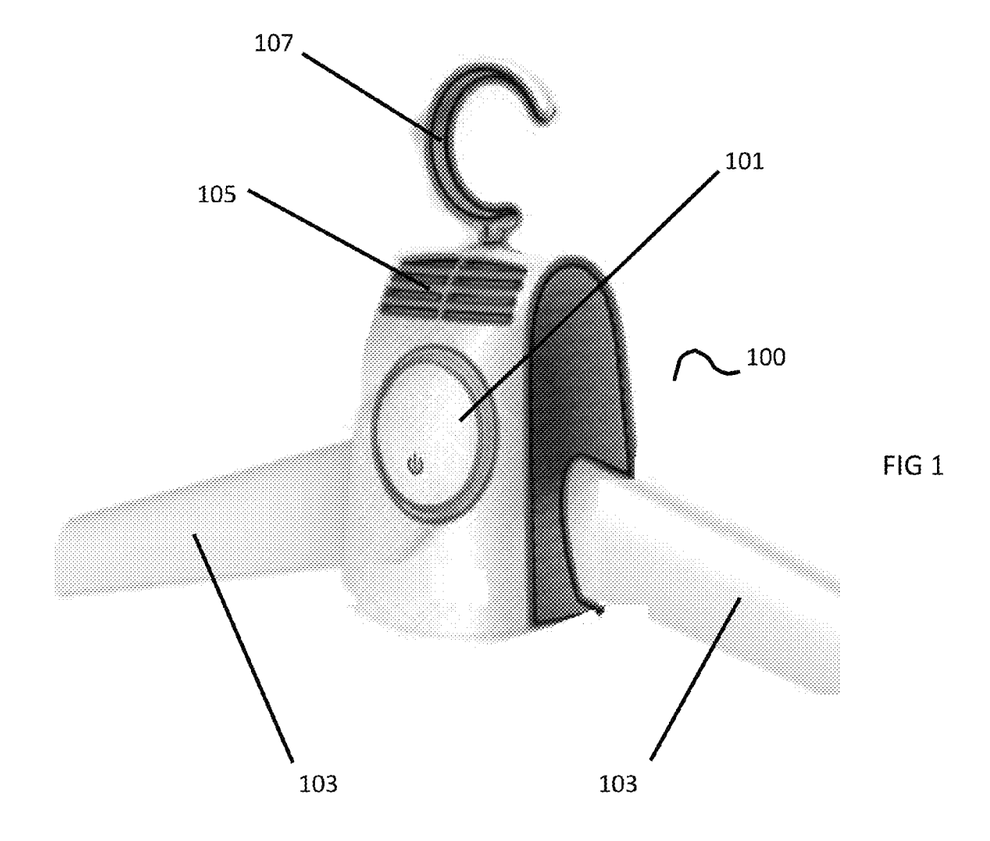
FIG. 1 is a side view of the apparatus of the present invention.

FIG. 1 teaches an apparatus (100) in accordance with an embodiment of the present invention wherein a base member (102) has associated with it an inlet (105), wherein air can enter into the apparatus, extending arms (103), wherein said extending arms are used for both positioning clothes items thereon, as well as delivering hot air or cool air to an attached clothing item, a hanger method (107), which allows the apparatus and any clothes to be positioned above the floor, such as in a closet, and an indicator/controller (101) wherein the indicator/controller indicates to a user whether cool air or hot air is being delivered to attached clothing items on the apparatus (100), as well as allowing a user to change the delivery of hot air to cool air and vice versa.

The apparatus (100) can be made of a variety of polymer material such as plastic. In one embodiment, the arms (103) of the apparatus (100) can be removed to allow for easy storage. The indicator/controller (101) can be actionable such that it can be pressed into the apparatus itself. This allows a user to be able switch the device, i.e. going from hot air to cool air. Thus, the indicator/controller (101) is in essence, a switch mechanism. Not shown in FIG. 1 is an alternative attachment means for attaching the power supply of the apparatus (100) to a mains power supply, such as an outlet. In an alternative embodiment, also not shown, the apparatus can have a battery pack on its reverse side, which allows batteries to be suitable for the power supply operation of the apparatus (100). In an alternative embodiment, the batteries that are used within the apparatus (100) are rechargeable batteries that are non-removeable, but rather allow the power supply of the apparatus to be recharged on a periodic basis by the user.

In alternative embodiments, the apparatus can include a fragrance delivery means, wherein during delivery of either hot or cool air into the hung textile, a fragrance can be co-delivered therewith. This allows a user to improve the smell of the textile during drying with the present invention.

Figure 2:
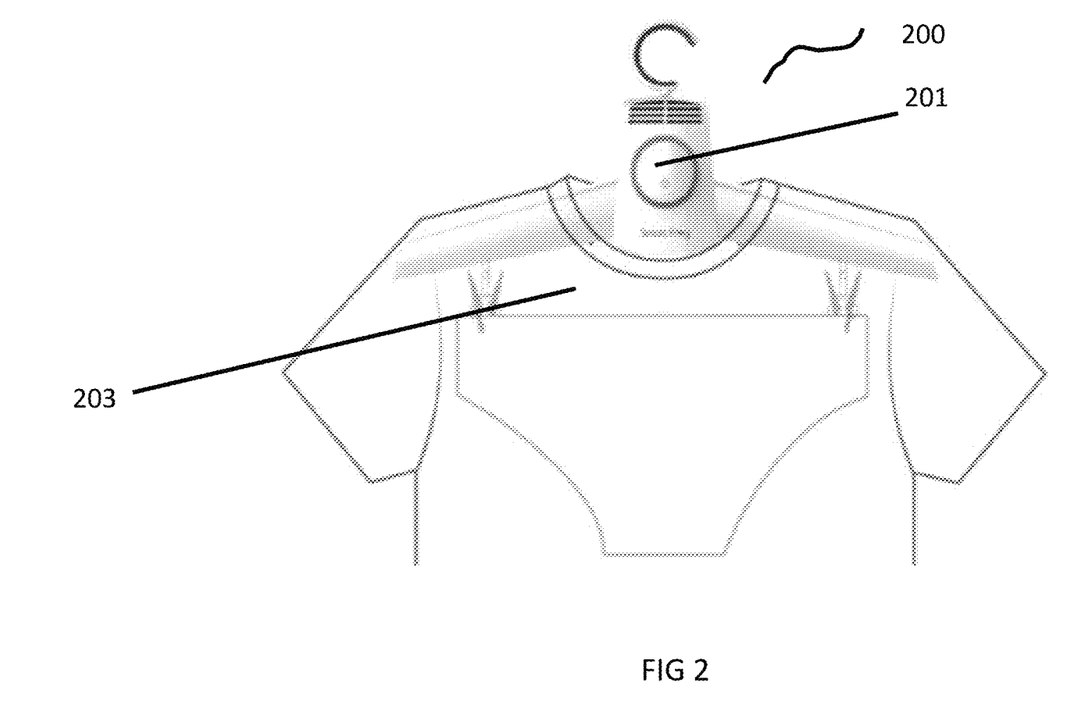
FIG. 2 is a frontal version of the apparatus of the present invention used in conjunction with clothes.

FIG. 2 shows the apparatus (200) being used in conjunction with one or more clothing items (203). As shown, the arms (202) of the apparatus are used to engage with the clothing items. To be shown in a further figure, the arms 202 also deliver the hot air or cool air to the attached clothing items (203). The indicator/controller (201) of the apparatus allows a user to visually determine whether hot air, or cool air, is being delivered to the hung clothing items (203). The indicator/controller (201) also allows a user to manually control whether hot air or cool air is being delivered to the attached clothing items (203).

In an alternative embodiment, various lengths of arms (202) can be used with the body of the apparatus 200. For example, in the event that smaller clothes are being used, the smaller arms can be used with the body. In the event that larger items are used, requiring more surface area to allow for stable attachment of clothing items, larger arms can be attached to the body, for example, with the use of coats. Furthermore, the arms can be flexible, thus allowing them to be positioned into rather irregular items. For example, flexible arms can be with shoes.

Figure 3:
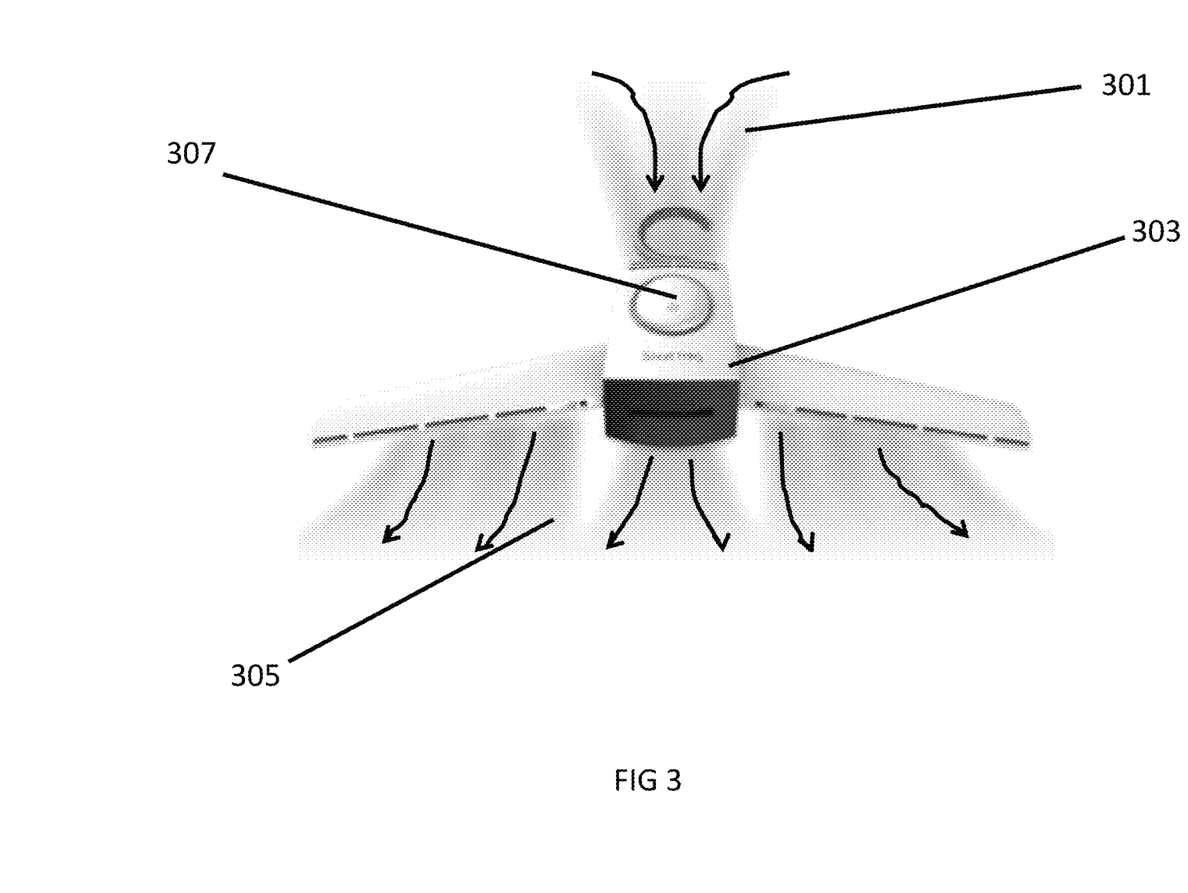
FIG. 3 shows the airflow going through the apparatus of the present invention.

FIG. 3 is an embodiment of the apparatus wherein the air flow i.e. the inlet and outlet air flow as it goes through the body is shown.

As the apparatus 303 is being used the apparatus 303 is turned on via its indicator/controller (307) and inlet air (301) is pulled in through the top of the body (300). As the inlet air (301) passes through the body (300) either cool air or hot air are sent through its outlet ports (305). As stated, the indicator/controller (307) determines whether the outlet air is hot air or cool air.

In one embodiment, in addition to air being delivered through the apparatus 303, ultraviolet (UV) light by be delivered from the apparatus into the attached clothes. Through the use of ultraviolet lamps attached to the apparatus, UV light can be used to both dry the clothes and kill bacteria that may develop as the clothes are drying. The UV light may also be used to speed up the drying time.

Figure 4:
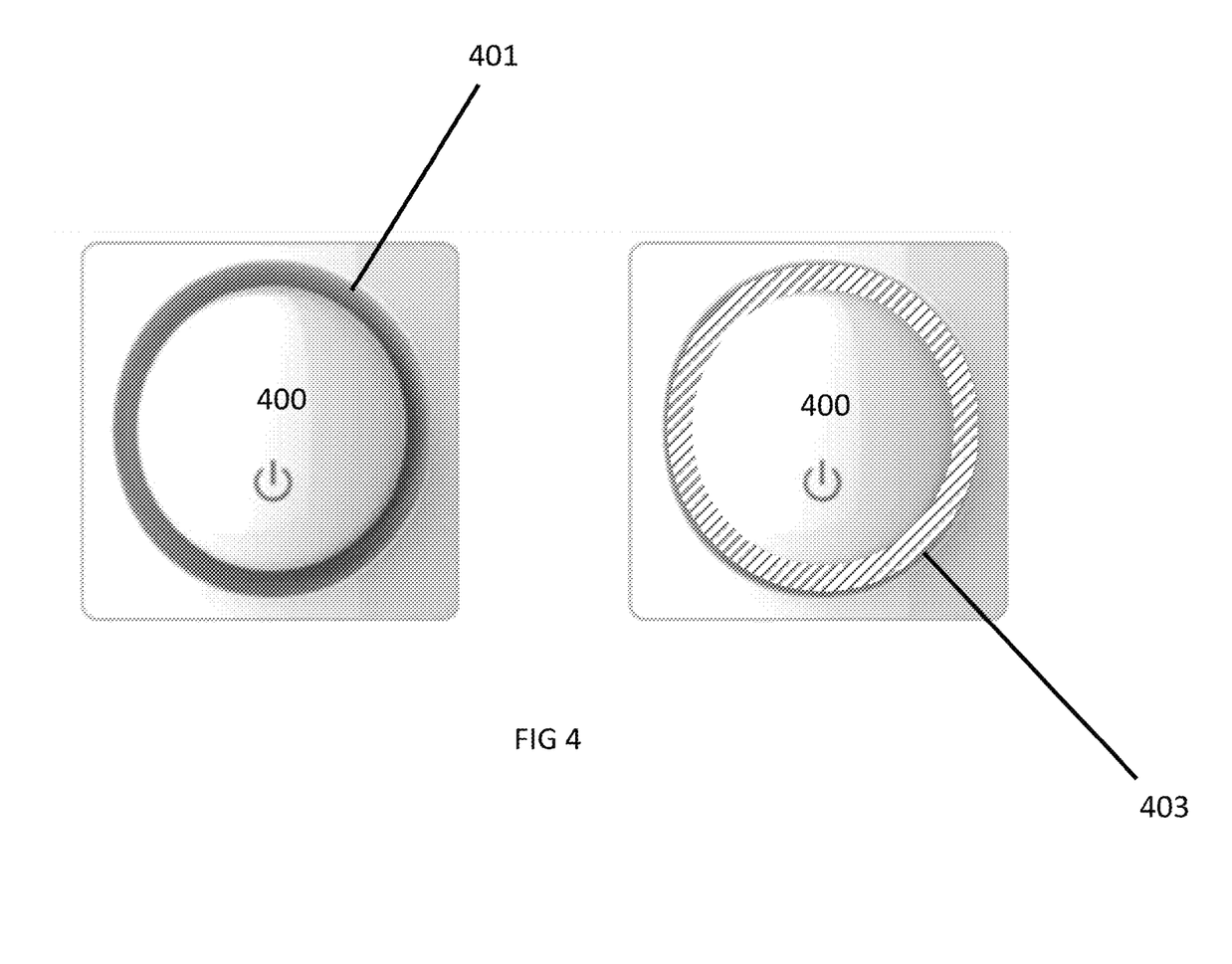
FIG. 4 shows the indicator method of the apparatus of the present invention.

FIG. 4 is an embodiment of the indicator/controller actuator means (400) of the present invention. The indicator/controller (400) allows a user to both visually determine whether hot air or cool air is being sent into the attached clothing items, hot air being at 401, cool air being at 403. As an actuator means, a user can manually change hot air to cool air and vice versa. A user will be able to determine whether the apparatus itself has auto change from hot air to cool air. Though not shown, the actuator means of the indicator/controller (400) works in conjunction with circuitry, to be discussed later, of the present invention. The actuator means is essentially as switching mechanism, which switches on an associated heater mechanism and switches off said associated heater mechanism.

Figure 5:
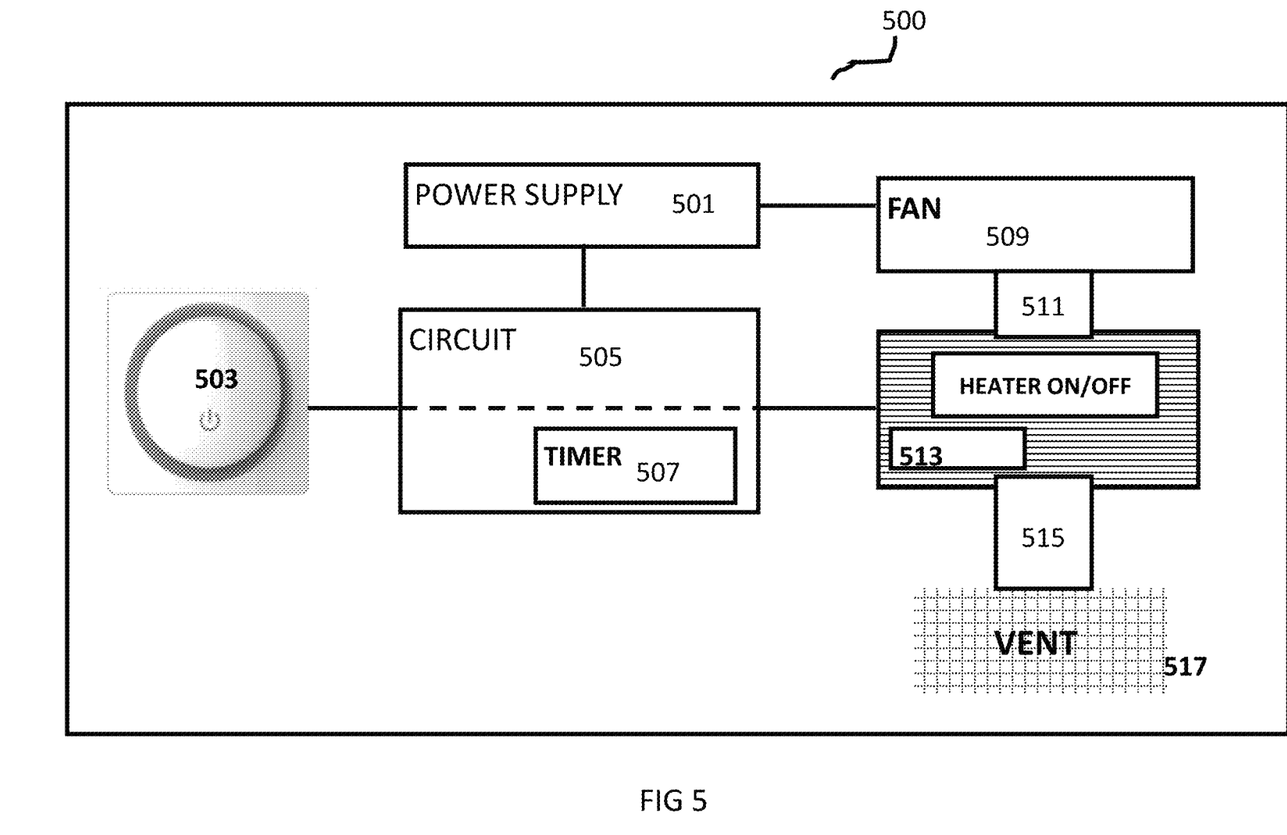
FIG. 5 is the schematic of the inner circuitry of the apparatus of the present invention.

FIG. 5 is an embodiment of the circuitry of the present invention. As shown, the circuitry (500) includes thereon, essentially, a power supply (501), a circuit board (505), a timer associated with the circuit board (507), an switching mechanism (503), a fan, which allows inlet air (509), a channel (511) for air which connects to a heater (513), a further channel (515), which connects to a vent (517) for outlet into attached clothing items.

Power supply (501) as used with the circuit (500) can be either connected to a hard power source, such as a mains power supply (A/C/power), or in an alternative embodiment, D/C power source, such as batteries or a solar cell for using solar power.

The power supply can also include battery supply wherein the batteries can be stored within the apparatus. In an alternative embodiment, in the event that batteries are used, the batteries can be rechargeable batteries, which are permanently stored within the apparatus. In such an embodiment, the rechargeable batteries can be selected from the group comprising lithium ion, nickel metal, nickel cadmium, lead acid, magnesium batteries, lithium polymer, and other types of rechargeable batteries.

The power supply is electrically connected to a circuit (505). The circuit is essentially a PCB board upon which various items may be attached or soldered thereon. For example, a timer (507) can be attached to the circuit (505), the timer being used to allow the apparatus to switch from hot air to cool hair based on a certain period of time, i.e. one hour, two hours, three hours, etc. The circuit board can further include a processor (not shown) to be included thereon. The processor can be used to provide "smart technology" to the operation of the apparatus generally. Such an embodiment where a processor is included on the circuit board, the processor can have the ability to allow a user to indicate which type of textile is being attached to the clothes drying apparatus. For example, the processor can allow a user to indicate whether the clothing item is 100% cotton, a cotton/polyester blend, 100% polyester, silk, or any other type of fabric. The processor can then be used in conjunction with the circuit to control the passage of hot air and cool air into the clothing item. The processor could also be used to control the temperature range of the cool air and hot air, for example, instead of there being hot air art one temperature and cool air at one temperature, the processor can allow the apparatus to operate within a range, for example, from 50 degrees centigrade to 65 degrees centigrade. In the advent that a processor is included on the circuit board (505), the processor can include a microprocessor, microcontroller, programmable digital signal processor, or other programmable device. Though also further not shown, the circuit (505) can include a variety of other components, such as passive or active analog components, including resistors, capacitors, inductors, transistors, operational amplifiers, and so forth, as well as discrete digital components, such as logic components, shift registers, latches, or any other separately packaged chip or other component for realizing a digital function. The circuit (505), in the event that a processor is used, can further include computer executable code that controls operation of the apparatus overall. The circuit (505) can also include in an alternative embodiment, though not shown, memory wherein said memory can allow the apparatus to recall certain desired functionalities of a user, i.e. such as hot air for a period of time, and cool air for a period of time. In the advent that memory is used, the memory can include read-only memory, programmable read-only memory, electrically erasable programmable read-only memory, random access memory, dynamic access memory, etc. attached to the circuit (505) is a switching means (503) which allows a user to both have an indicator/controller of the operation of the apparatus. Further included within the internal workings of the apparatus is a fan (509). The fan is used to allow the sucking of air into the clothes drying apparatus. The fan has attached thereto a channel for the passage of air from the inlet into the rest of the system. The fan (509) receives its power from the electrically attached power supply (501).

The heater is attached to the overall system via the circuit (505) and the channel (511) which is connected to the fan (509). The heater allows any air coming from the fan (509) through the channel (511) to be heated, or not. The operation of the heater is controlled by the attached circuit (505). For example, through its timer (507), the circuit (505) can actuate, i.e. turn on the heater (513) or turn off the heater. In the advent that a processor is used in conjunction with the circuit (505), the processor can be used to control the on/off mechanism of the heater. In an alternatively embodiment, the processor can also be used to control the level of the heater (513). For example, the processor can be used to make the heater (513) hotter or cooler, depending on the desires of the user.

Heaters suitable for use in the present invention can include convection heaters, radiative heaters, and quartz heaters, as well as ceramic heating elements. In a preferred embodiment, the heating element used in the present invention is based off of ceramic heating technology. Known as positive temperature coefficient ceramic heaters, this type of heater allows for autotuning of the power and temperature limit to be used in the apparatus during the heating of the air that passed into the clothing item. As clothing items are known to be relatively flammable, it is an important safety mechanism to utilize a heater that auto-tunes itself based upon the conditions of the attached clothing item. This allows for the avoidance of any fires or other hazardous conditions.

The heater (513) is further connected vias a vent (515) via a channel (515) to an out vent (517). The out vent (517) is thus used to pass either hot air or cool air into the attached clothing item. In the preferred embodiment, the vents are placed on either side of the arms that are attached to the apparatus (not shown). The vents can further be positioned such that they go through the middle body of the apparatus (not shown).

Figure 6:
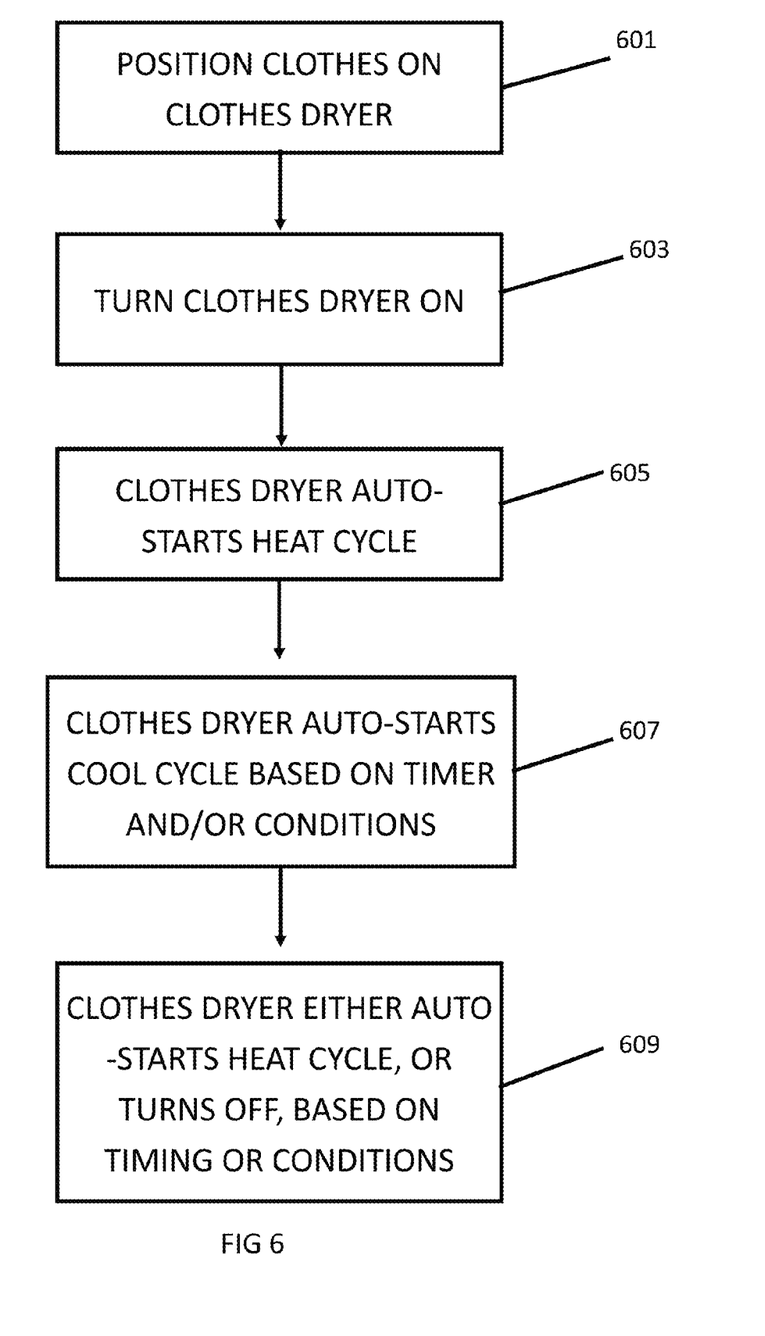
FIG. 6 shows a method of using the apparatus of the present invention.

FIG. 6 is an embodiment of the method of operation of the present invention. As shown in FIG. 6, clothes are firstly positioned on the clothes dryer (601). As discussed, various clothing items can be used, including shirts, pants, jackets, etc. A user then turns the clothes dryer on (603). As discussed, the turning on mechanism of the clothes dryer can be an actuator means that is the indicator/controller on the front of the apparatus. Upon turning it on, the apparatus can either start off with hot air passing through its body into the attached clothing items, or passing cool air directly from the inlet air to the vent. In one embodiment, the apparatus autostarts in a heat cycle (605). In other words, the apparatus assumes that the attached clothing item is wet and thus first needs a level of hot air to sufficiently dry it. In another embodiment (not shown), cool air can firstly be passed into the attached clothing item. The passing of cool air can occur when the clothing item is not met, but merely needs to be aired out. Following the autostart of the first cycle, the clothes dryer autostarts the second cycle (607). In one embodiment the auto starting of the second cycle is the passage of cool air into the attached clothes. Auto Starting of the second cycle can be based either on conditions or timing. For example, in the event that the circuitry of the apparatus includes a processor that has the capability to determine the level of humidity of the attached clothing item when the humidity exists at a certain level, i.e. the level of wetness of the clothes is at a certain level, the apparatus can then switch to passing cool air into the clothing item. In another embodiment, cool air can be passed into the clothing item after a set period of time, for example, one hours, two hours, or three hours. In a preferred embodiment it has been shown that the passage of cool air after approximately three hours is suitable following the passage of hot air. In a further alternative embodiment, through the actuator means of the indicator.controller on the apparatus, a user can manually switch from hot air to cool air. Following the autostart of the previous cycle, based on either timing or conditions, the apparatus may perform either switching to a new cycle, continuing the previous cycle, or shutting down. As stated, entering the new cycle can be based on the humidity level, for example, the humidity level of the clothing item. Alternatively, switching to the new cycle can be based on timing, i.e one hour, two hours, three hours.

The invention claimed is:

1. An apparatus for drying individual items of clothing, comprising:
    a base member having extended arms for interacting with said individual items of clothing, wherein said base member has an inlet for air, and a hook for hanging on an elevated bar;
    an indicator/controller actuator positioned on said base member, wherein said indicator/controller is actionable;
    one or more outlet vents positioned on said extended arms for delivering air into said individual items of clothing;
    a power supply positioned on a PCB board stored within the housing of said base member;
    a fan positioned within the housing of said base member;
    a processor positioned on a PCB board stored within the housing of said base member
    a positive temperature coefficient ceramic heater positioned with the housing of said base member; and
    a timer positioned on a PCB board stored within the housing of said base member for determining when said outlet vents deliver hot air or cool air into said individual items of clothing.

2. The apparatus for drying individual items of clothing of claim 1, further comprising a UV lamp for delivery of UV light into the items of clothing.

3. The apparatus for drying individual items of clothing of claim 1, further comprising a fragrance delivery system for delivering a fragrance into said individual items of clothing.

4. The apparatus for drying individual items of clothing of claim 1, wherein said power supply is an A/C power supply or a D/C power supply.

5. The apparatus for drying individual items of clothing of claim 4, wherein when said power supply is an A/C power supply, the acceptable voltage range for input into said base member is from 85V to 265V.

6. The apparatus for drying individual items of clothing of claim 4, wherein when said power supply is a D/C power supply, the acceptable voltage range for input into said base member is from 4V to 36V.

7. The apparatus for drying individual items of clothing of claim 6, wherein said D/C power supply can be selected from the group comprising batteries, rechargeable batteries, solar cell, USB attached portable power bank, or connection to a vehicle such as car or ship.

8. The apparatus for drying individual items of clothing of claim 5, further comprising a voltage regulation module for rectifying power dips and surges.

9. The apparatus for drying individual items of clothing of claim 1, wherein said indicator/controller actuator possesses LED lighting elements which indicate the on/off, or heating/cooling operation phase of the apparatus.

10. The apparatus for drying individual items of clothing of claim 1, wherein said timer is electrically connected to said processor.

11. A method of drying individual items of clothing using the apparatus of claim 1, said method comprising the steps of:
    positioned an item of clothing on the arms of said apparatus;
    pressing said indicator/controller to turn said apparatus on;
    inputting air into said apparatus via inlet vent;
    outputting air into said item of clothing via one or more outlet vents;
    switching from outputting either cool air to hot air or hot air to cool air;
    continuing outputting said air into said item of clothing; and
    turning off said apparatus.

12. The method of drying individual items of clothing using the apparatus of claim 11, wherein pressing said indictor/controller results in LED indicator lights positioned within said indicator/controller to turn on.

13. The method of drying individual items of clothing using the apparatus of claim 11, wherein inputting air into said apparatus via inlet vent involves sucking air into the apparatus via a fan.

14. The method of drying individual items of clothing using the apparatus of claim 11, wherein outputting said air into said item of clothing involves outputting either hot air or cool air.

15. The method of drying individual items of clothing using the apparatus of claim 11, wherein switching from hot air to cool air or cool air to hot air occurs after a preset period of time.

16. The method of drying individual items of clothing using the apparatus of claim 11, wherein turning of said apparatus is automatic.

17. The method of drying individual items of clothing using the apparatus of claim 11, wherein turning of said apparatus is manual.

* * * * *

UNITED STATES PATENT AND TRADEMARK OFFICE
CERTIFICATE OF CORRECTION

| | | |
|---|---|---|
| PATENT NO. | : 9,803,314 B1 | Page 1 of 1 |
| APPLICATION NO. | : 15/600855 | |
| DATED | : October 31, 2017 | |
| INVENTOR(S) | : Zupnick | |

It is certified that error appears in the above-identified patent and that said Letters Patent is hereby corrected as shown below:

On the Title Page

Item (72) Inventors should read:
Cheskal Zupnick, New York, NY (US)

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*